(12) United States Patent
Lindem, III et al.

(10) Patent No.: US 8,717,935 B2
(45) Date of Patent: May 6, 2014

(54) OSPF NON-STOP ROUTING WITH RELIABLE FLOODING

(75) Inventors: Alfred C. Lindem, III, Cary, NC (US); Wenhu Lu, San Jose, CA (US); Ing-Wher Chen, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 100 days.

(21) Appl. No.: 13/310,653

(22) Filed: Dec. 2, 2011

(65) Prior Publication Data

US 2013/0070637 A1    Mar. 21, 2013

Related U.S. Application Data (60) Provisional application No. 61/541,065, filed on Sep. 29, 2011, provisional application No. 61/535,942, filed on Sep. 16, 2011.

(51) Int. Cl.
| | | |
|---|---|---|
| *H04L 12/56* | (2011.01) | |
| *H04L 1/00* | (2006.01) | |
| *H04L 12/28* | (2006.01) | |
| *H04Q 7/24* | (2006.01) | |

(52) U.S. Cl.
USPC ........... 370/254; 370/401; 370/255; 370/397; 370/338

(58) Field of Classification Search
USPC ......... 370/255, 277, 310, 328, 331–338, 352, 370/389, 395–401, 509
See application file for complete search history.

(56) References Cited

U.S. PATENT DOCUMENTS

| | | | |
|---|---|---|---|
| 6,856,627 B2 * | 2/2005 | Saleh et al. | 370/397 |
| 6,980,537 B1 * | 12/2005 | Liu | 370/338 |
| 7,065,059 B1 | 6/2006 | Zinin | |
| 7,095,747 B2 | 8/2006 | Sarmiento et al. | |
| 7,117,241 B2 | 10/2006 | Bloch et al. | |
| 7,248,579 B1 | 7/2007 | Friedman | |
| 7,292,535 B2 | 11/2007 | Folkes et al. | |
| 7,391,730 B1 | 6/2008 | Chandra et al. | |
| 7,573,811 B2 | 8/2009 | Koppol | |
| 7,639,680 B1 | 12/2009 | Roy et al. | |
| 7,787,364 B2 | 8/2010 | Maeda et al. | |
| 7,804,770 B2 | 9/2010 | Ng | |
| 7,940,650 B1 | 5/2011 | Sandhir et al. | |

(Continued)

OTHER PUBLICATIONS

OSPF NSR, Cisco Systems, Inc., Jun. 10, 2011, 6 pages.

(Continued)

*Primary Examiner* — Jung Park
*Assistant Examiner* — Chuong M Nguyen
(74) *Attorney, Agent, or Firm* — Blakely Sokoloff Taylor & Zafman LLP

(57) ABSTRACT

A network element is configured for open shortest path first (OSPF) non-stop routing (NSR) with reliable flooding. An active OSPF instance determines to flood a link-state advertisement (LSA). The LSA is synchronized with a backup OSPF instance including storing the LSA with a status that indicates that flooding is pending. The active OSPF instance attempts to reliably flood the LSA to a set of adjacent network elements of the flooding scope of the LSA. If flooding of the LSA completes, the active OSPF instance causes the backup OSPF instance to alter the status of the LSA to indicate that flooding is complete. If the backup OSPF instance becomes the currently active OSPF instance prior to the flooding of the LSA completing, then the new active OSPF instance attempts to reliably flood the LSA.

18 Claims, 5 Drawing Sheets

(56) References Cited

U.S. PATENT DOCUMENTS

| | | | |
|---|---|---|---|
| 8,199,646 B1 | 6/2012 | Cain | |
| 8,428,003 B1* | 4/2013 | Chen et al. | 370/328 |
| 2002/0191616 A1 | 12/2002 | Sarmiento et al. | |
| 2002/0196794 A1 | 12/2002 | Bloch et al. | |
| 2003/0218982 A1* | 11/2003 | Folkes et al. | 370/238 |
| 2004/0042395 A1 | 3/2004 | Lu et al. | |
| 2004/0136371 A1* | 7/2004 | Muralidhar et al. | 370/389 |
| 2005/0105524 A1* | 5/2005 | Stevens et al. | 370/389 |
| 2005/0265260 A1* | 12/2005 | Zinin et al. | 370/255 |
| 2006/0215547 A1 | 9/2006 | Koppol | |
| 2007/0245034 A1 | 10/2007 | Retana et al. | |
| 2008/0056294 A1 | 3/2008 | Maeda et al. | |
| 2009/0086622 A1 | 4/2009 | Ng | |
| 2009/0116514 A1* | 5/2009 | Yan et al. | 370/509 |
| 2009/0129398 A1* | 5/2009 | Riegel et al. | 370/401 |
| 2009/0279536 A1* | 11/2009 | Unbehagen et al. | 370/352 |
| 2009/0288098 A1 | 11/2009 | Abd-El-Malek et al. | |
| 2010/0254262 A1 | 10/2010 | Kantawala et al. | |
| 2011/0026460 A1 | 2/2011 | Lafuente | |

OTHER PUBLICATIONS

J. Moy, OSPF Version 2, Network Working Group, Request for Comments: 2328, Apr. 1998, 245 pages.

Non-Final Office Action, U.S. Appl. No. 13/310,656, dated Jul. 9, 2013, 23 pages.

Non-Final Office Action, U.S. Appl. No. 13/345,508, dated Jul. 16, 2013, 31 pages.

Non-Final Office Action, U.S. Appl. No. 13/349,530, dated Jul. 15, 2013, 12 pages.

* cited by examiner

OSPF NON-STOP ROUTING WITH RELIABLE FLOODING

CROSS-REFERENCE TO RELATED APPLICATIONS

This application claims the benefit of U.S. Provisional Application No. 61/541,065, filed on Sep. 29, 2011; and U.S. Provisional Application No. 61/535,942, filed on Sep. 16, 2011; which are hereby incorporated by reference.

FIELD

Embodiments of the invention relate to the field of computer networking; and more specifically, to Open Shortest Path First (OSPF) Non-stop Routing (NSR) with reliable flooding.

BACKGROUND

A computer network is a geographically distributed collection of interconnected communication links and subnetworks for transporting data between nodes, such as computers. Many types of computer networks are available, with the types ranging from local area networks (LANs) to wide area networks (WANs). A LAN is an example of a subnetwork that provides relatively short distance communication among the interconnected stations, whereas a wide area network enables long distance communication over a larger geographic area using links provided by public or private telecommunications facilities. The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as routing domains or autonomous systems. The networks within an autonomous system are typically coupled together by conventional intradomain routers. These routers manage communication among local networks within their domains and communicate with each other using an intradomain routing (or an interior gateway) protocol. An example of such a protocol is the Open Shortest Path First (OSPF) routing protocol described in Request for Comments (RFC) 2328, OSPF Version 2, by J. Moy (1998). The OSPF protocol is based on link-state technology and, therefore, is hereinafter referred to as a link state routing protocol.

SUMMARY

A network element is configured for open shortest path first (OSPF) non-stop routing (NSR) with reliable flooding. A first OSPF instance of the network element currently acting as an active OSPF instance determines to flood a link-state advertisement (LSA). The first OSPF instance synchronizes the LSA with a second OSPF instance of the network element currently acting as a backup OSPF instance, including the second OSPF instance storing the LSA with a status that indicates that flooding is pending. The first OSPF instance attempts to reliably flood the LSA to a set of one or more adjacent network elements that comprise the flooding scope of the LSA. Attempting to reliably flood the LSA includes transmitting the LSA to each of the set of adjacent network elements in the flooding scope with an exception of one adjacent network element if the LSA was received from that adjacent network element, including the LSA on a retransmission list for each adjacent network element the LSA was flooded to, and maintaining the retransmission lists including removing the LSA from a retransmission list for an adjacent network element responsive to receiving an acknowledgement of receipt of that LSA from that network element. If flooding of the LSA is complete, the first OSPF instance causes the second OSPF instance to alter the status of the LSA to indicate that flooding is complete. If the second OSPF instance has become the currently active OSPF instance prior to the flooding of the LSA completing, then the second OSPF instance attempts to reliably flood the LSA to all of the adjacent network elements in the flooding scope of the LSA. Thus, LSAs are reliably flooded while maintaining the minimum steady state overhead between the active and backup OSPF instances.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Each network element running OSPF maintains an identical link state database (LSDB) describing the topology of the autonomous system (AS). Each individual piece of the LSDB is a particular network element's local state, e.g., the network element's usable interfaces and reachable neighbors or adjacencies. As used herein, neighboring network elements (or "neighbors") are network elements that have interfaces to a common network, wherein an interface is a connection between a network element and one of its attached networks. Moreover, an adjacency is a relationship formed between selected neighboring network elements for the purpose of exchanging routing information and abstracting the network topology. One or more router adjacencies may be established over an interface.

The adjacencies are established and maintained through the use of the well-known Hello protocol. Broadly stated, the Hello protocol ensures that communication between neighbors is bi-directional by periodically sending Hello packets out of all of the interfaces. Bi-directional communication is indicated when the router "sees" itself listed in the neighbor's Hello packet. On broadcast and non-broadcast multi-access (NBMA) networks, the Hello protocol elects a designated router (DR) and backup designated router (BDR) for the network.

Once a network element becomes adjacent, it advertises its link-state to adjacent network elements on the network by sending link state advertisements (LSAs). These LSAs are distributed through a process called reliable flooding, in which a router forwards an LSA to its neighbor network element(s) that are in the flooding scope of the LSA and receipt of the LSA is acknowledged by the receiving neighbor network element(s). An LSA may be link-scoped, area-scoped, or AS-scoped. For a link-scoped LSA, the neighbor network elements that are neighbors on the link (e.g., OSPF interface) are in the flooding scope. For an area-scoped LSA, the neighbor network elements that are in the area are in the flooding scope. For an AS-scoped LSA, all the neighbor network elements are in the flooding scope.

By way of a specific example, a first network element that originates an LSA forwards that LSA to all of its neighboring network elements in the flooding scope of the LSA. As another example, a first network element that receives a new instance of an LSA from a second network element forwards that LSA to all of its neighboring network elements in the flooding scope of the LSA with the exception of the second network element. The first network element maintains a retransmission list for each network element (neighbor) to which it is in exchange state or above. For each network element to which the LSA has been forwarded, the first network element adds the LSA to the retransmission list associated with that. When the first network element receives an acknowledgment for the LSA from a particular network element, the LSA is removed from that network element's retransmission list. If a network element fails to acknowledge the LSA within a specified time and therefore the LSA remains on that router's retransmission list, the LSA is retransmitted to that network element. This process repeats until the retransmission lists are empty.

For greater reliability, some OSPF implementations use a technique called Non-stop Routing (NSR), in which state is synchronized between an active and standby OSPF instance to assure that a failure on the active OSPF instance and switchover to the standby OSPF instance does not result in any loss of OSPF protocol synchronization. Typically, the state must be synchronized between OSPF instances using Inter-Process Communication (IPC) which is much slower than normal memory access. Hence, the amount of state which is synchronized must be minimized While many vendors support OSPF NSR and assure the OSPF LSDB is synchronized between redundant OSPF instances, it is unclear whether or not they assure OSPF reliable flooding is preserved across all failures. The OSPF protocol is robust in that it assures that every LSA is retransmitted until acknowledged. The OSPF protocol accomplishes this by maintaining LSA retransmission lists for each neighbor. LSAs remain on these lists until they are acknowledged (refer to Section 12 in RFC 2328 for more information).

In one embodiment of the invention, a network element includes at least two OSPF instances, where a first one acts as an active OSPF instance (or sometimes referred to as a primary OSPF instance) and the second one acts as a backup OSPF instance (or sometimes referred to as a standby OSPF instance or secondary OSPF instance). The active and backup OSPF instances may be executed by routing processors (RPs) on different hardware or the same hardware. For example, one of the OSPF instances may be executed by an RP on a first control card while the other OSPF instance is executed by an RP on a second control card. As another example, the OSPF instances may be executing on different cores of a single processor. As yet another example, the OSPF instances may be running on different processors on the same card.

In one embodiment, for each LSA to be flooded by the active OSPF instance (e.g., a new instance of an LSA received by the active OSPF instance, an LSA originated by the active OSPF instance (a self-originated LSA), an LSA that is being flushed from the domain, and an LSA that is being refreshed), a separate counter is maintained that indicates the number of OSPF neighbor retransmission lists on which the LSA is awaiting acknowledgement. In order to minimize the overhead necessary to guarantee reliable flooding, the only transitions which will be synchronized with the backup OSPF instance will be those after which the flooding is complete. When a switchover from the active to the backup OSPF instance occurs, the LSAs with non-zero counts will be reliably flooded to all neighbors in the flooding scope. While a bit more flooding overhead is incurred upon switchover, the steady-state NSR overhead is minimized By way of a specific example, the active OSPF instances synchronizes the new instances of LSAs it receives and the LSAs it originates (either a new LSA or an update of an existing LSA) with the backup OSPF instance prior to or concurrently with any necessary flooding of those LSAs to the neighboring network elements. The active OSPF instance may also, for each LSA it synchronizes with the backup OSPF instance, indicate to the backup OSPF instance whether flooding of that LSA is pending in one embodiment. Alternatively, the backup OSPF instance may assume that flooding is pending for each LSA it receives from the active OSPF instance unless the active OSPF instance indicates that flooding is complete for that LSA (not pending). Although the active OSPF instance synchronizes the new instances of LSAs it receives and originates with the backup OSPF instance, the active OSPF instance does not synchronize the neighbor retransmission lists with the backup OSPF instance. When flooding of an LSA is complete (e.g., an acknowledgement has been received from each neighbor network element that was sent the LSA), the active OSPF instance indicates to the standby OSPF instance that the flooding is complete for that LSA, and the backup OSPF instance then marks the flooding for that LSA as being complete. Thus, the backup OSPF instance maintains a list of LSAs whose flooding is not complete. When a switchover occurs from the active OSPF instance to the backup OSPF instance (the backup OSPF instance becomes the new-active OSPF instance), the new-active OSPF instance determines whether the flooding of any LSAs is pending and reliably floods any such LSAs to all neighboring network elements.

Figure 1:
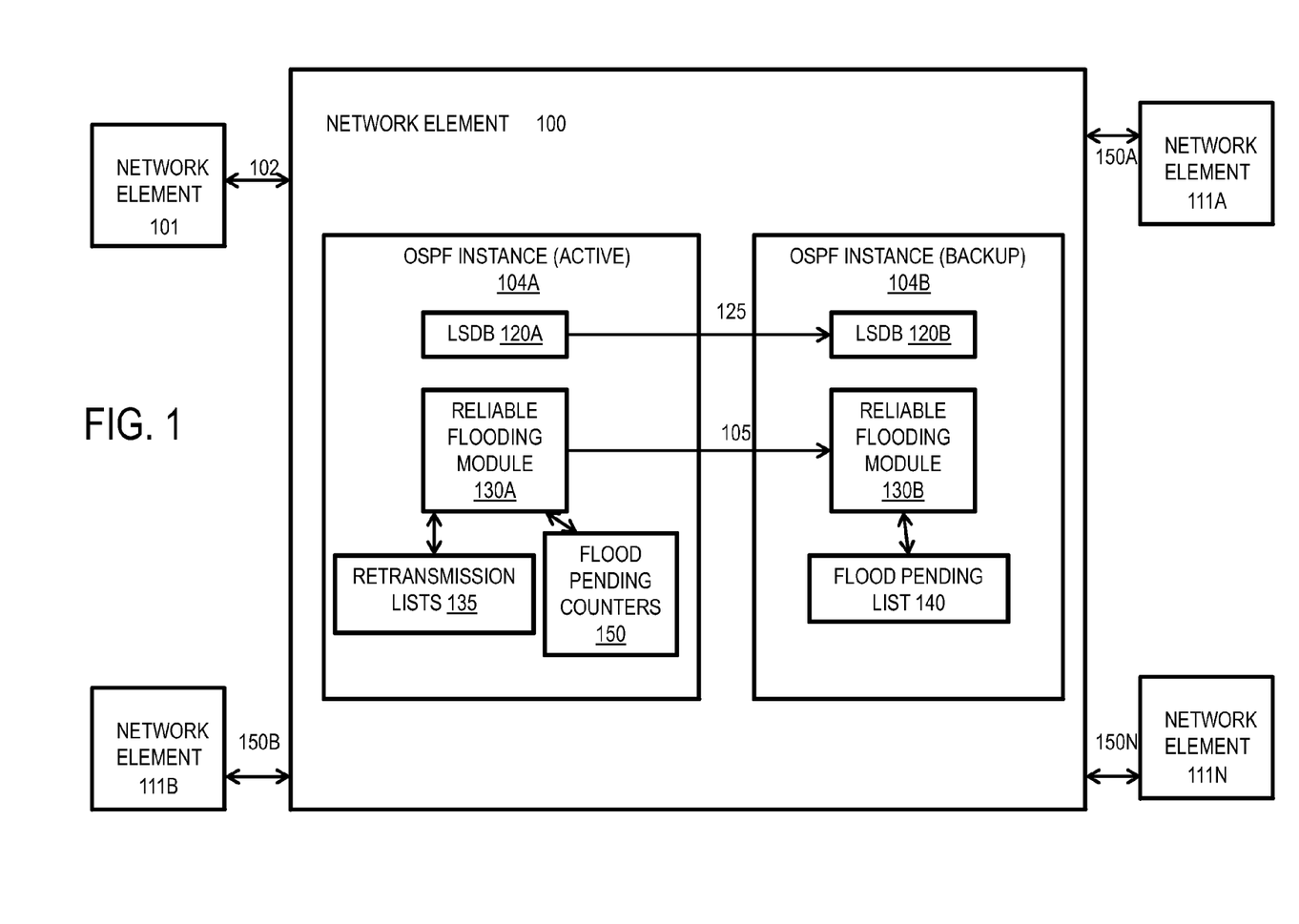
FIG. 1 illustrates an exemplary network that implements OSPF Non-stop Routing (NSR) with reliable flooding according to one embodiment.

FIG. 1 illustrates an exemplary network that implements OSPF Non-stop Routing (NSR) with reliable flooding according to one embodiment. The network includes the network elements 100, 101, and 111A-111N. The network element 100 includes the OSPF instances 104A and 104B, where the OSPF instance 104A is currently acting as the active OSPF instance and the OSPF instance 104B is currently acting as the backup OSPF instance in an NSR implementation.

The network element 100 receives LSAs from its neighboring network elements. For example, the network element 100 receives LSA(s) from the network element 101 over the link 102. Specifically, the OSPF instance 104A receives LSA (s) from the network element 101 over the link 102. The OSPF instance 104A processes the received LSAs including storing the information from the LSA into its LSDB 120A. In addition, the OSPF instance 104A synchronizes 125 the received LSAs with the OSPF instance 104B (the OSPF instance 104B then stores the information in the LSAs into its LSDB 120B). The network element 100 also originates LSAs (self-originated LSAs) to transmit to its neighboring network elements.

The OSPF instance 104A performs a reliable flooding procedure to flood the LSAs it has received and the LSAs it originates to its neighbor network elements. For example, the reliable flooding module 130A floods a new instance of an LSA received from the network element 101 to the network elements 111A-111N over the links 150A-N respectively (assuming that the network elements 111A-111N are part of the flooding scope of the LSA) and adds the LSA to the retransmission lists 135 for each network element 110A-111N. As another example, the reliable flooding module 130A floods an LSA originated by the OSPF instance 104A to the network elements 101 and 111A-111N and adds the self-originated LSA to the retransmission list 135 for each of the network elements 101 and 111A-111N. In one embodiment, a retransmission list for each network element 110 and 111A-11N is maintained that includes a list of LSAs that have been flooded but not acknowledged. Those LSAs on the list will be flooded at periodic intervals until they are acknowledged or until the adjacency is destroyed. Upon receiving acknowledgement of a flooded LSA from a particular network element, that LSA is removed from the retransmission list that is being maintained for that network element.

The OSPF instance 104A does not synchronize the retransmission lists 135 with the OSPF instance 104B in one embodiment. The OSPF instance 104A maintains, for each received LSA and each self-originated LSA, a flood pending counter 150 that indicates the number of OSPF neighbor retransmission lists on which the LSA is awaiting acknowledgement. Thus, a particular flood pending counter 150 for an LSA indicates the number of neighbor network elements that have not yet acknowledged the LSA (the counter does not indicate which network elements have not yet acknowledged the LSA, only the number of neighbor network elements that have not yet acknowledged it). The reliable flooding module 130A increments a counter 150 when it adds an LSA to a retransmission list and decrements that counter 150 when it removes that LSA from a retransmission list.

In one embodiment, for each LSA received and each self-originated LSA, the OSPF instance 104A indicates 105 to the OSPF instance 104B whether flooding of that LSA is complete (meaning whether that LSA has been transmitted to each applicable neighbor network element and an acknowledgement has been received from each of those neighbor network elements). For example, after receiving a new instance of an LSA or originating an LSA, the OSPF instance 104A may transmit a message to the OSPF instance 104B that indicates that flooding of that LSA is pending. The OSPF instance 104B then marks the flooding of that LSA as being pending. For example, the reliable flooding module 130B maintains the flood pending list 140, which indicates the LSAs whose flooding is pending. The OSPF instance 104A indicates to the OSPF instance 104B when flooding is complete (e.g., when the flood pending counter 150 for that LSA is at 0). The OSPF instance 104B then marks that LSA as being complete or removes the LSA from the flood pending list 140.

When a switchover event occurs (the OSPF instance 104B becomes the new-active OSPF instance), the OSPF instance 104B floods those LSAs indicated as being flood pending (e.g., the LSAs on the flood pending list 140) to the neighbor network elements in the flooding scope of the LSA (e.g., the network elements 101 and 111A-N) using a reliable flooding procedure. For example, retransmission lists will be created and/or populated for the neighbor network elements.

Figure 2:
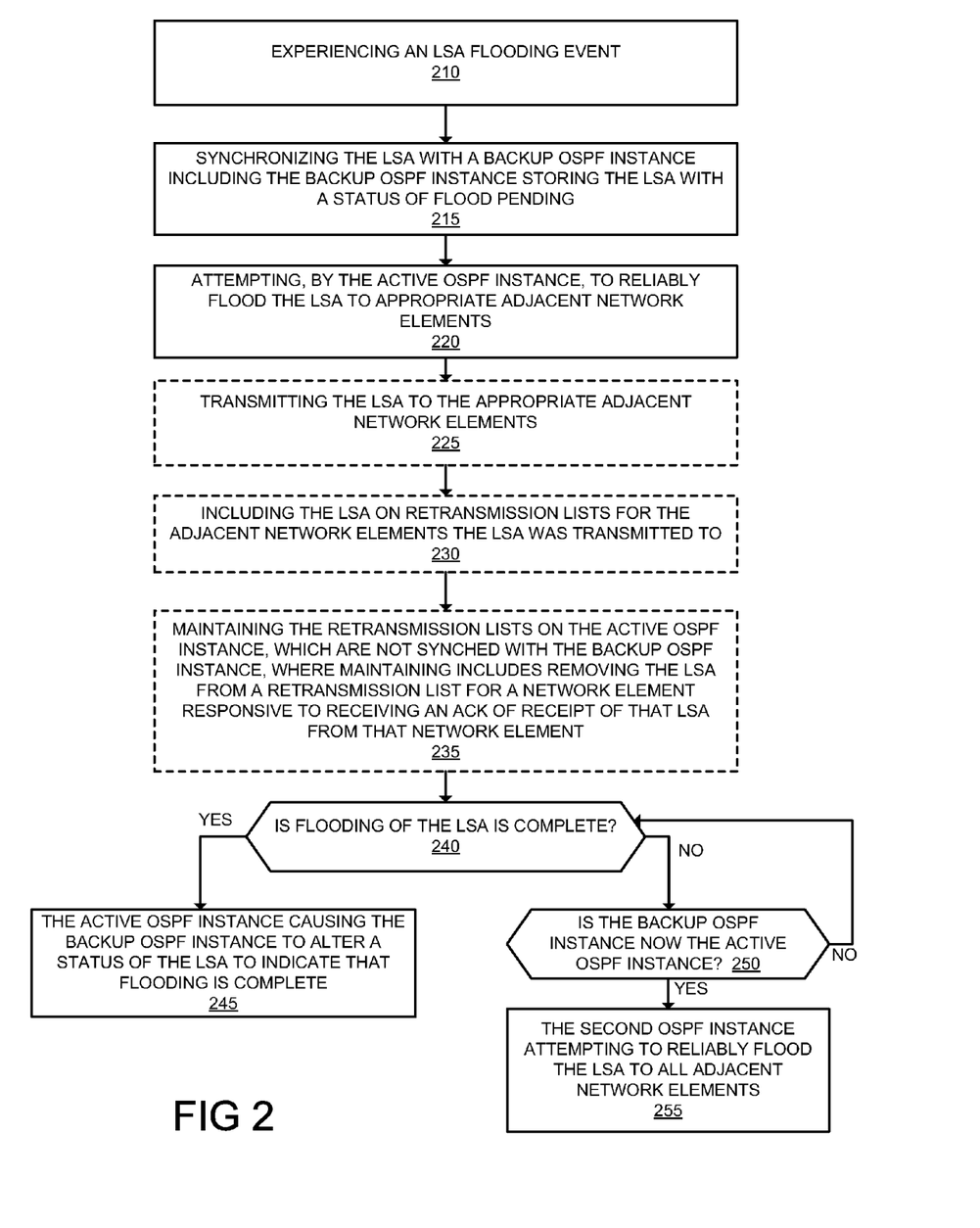
FIG. 2 is a flow diagram that illustrates exemplary operations for OSPF NSR with reliable flooding according to one embodiment.

FIG. 2 is a flow diagram that illustrates exemplary operations for OSPF NSR with reliable flooding according to one embodiment. The operations of this flow diagram and other flow diagrams will be described with reference to the exemplary embodiments of FIG. 1. However, it should be understood that the operations of the flow diagrams can be performed by embodiments of the invention other than those discussed with reference to FIG. 1, and the embodiments of the invention discussed with reference to FIG. 1 can perform operations different than those discussed with reference to the flow diagrams.

At operation 210, the network element 100 experiences an LSA flooding event (an LSA is to be flooded). Example LSA flooding events include the active OSPF instance 104A receiving a new instance of an LSA, the active OSPF instance 104A originating an LSA (a self-originated LSA), the active OSPF instance 104A determining to flush an LSA from the domain, and the active OSPF instance 104A refreshing an LSA. By way of a specific example, the network element 100 may receive a new instance of an LSA from neighboring network element 101 over link 102 (which is one of multiple adjacent network elements) that is to be flooded to the network elements 111A-111N, or originate an LSA to be flooded to the adjacent network elements 101 and 111A-111N. Specifically, the LSA is processed at the OSPF instance 104A, which is the active OSPF instance. Processing the LSA typically includes adding the LSA to the LSDB 120A.

Flow then moves to operation 215 and the OSPF instance 104A synchronizes the LSA with a backup OSPF instance 104B. Synchronizing includes the backup OSPF instance adding the LSA to the LSDB 120B and storing an indication that the LSA has a status of flood pending. For example, the reliable flooding module 130B stores the LSA in the flood pending list 140. In one embodiment, the OSPF instance 104A transmits a message to the OSPF instance 104B that indicates that the flooding of the LSA is pending completion, while in another embodiment such a message is not transmitted to the OSPF instance 104B but the OSPF instance 104B assumes that the flooding of the LSA is pending completion. Flow then moves to operation 220.

At operation 220, the active OSPF instance 104A attempts to reliably flood the LSA to the appropriate adjacent network elements (e.g., those network elements in the flooding scope of the LSA). For example, if the LSA is a new LSA instance that was received from the network element 101 and the network elements 111A-111N are in the flooding scope of the LSA, the active OSPF instance 104A attempts to reliably flood the LSA to the network elements 111A-111N (all the adjacent network elements in the flooding scope of the LSA except for the network element 101 that transmitted the LSA). As another example, if the LSA was self-originated and the network elements 101 and 111A-111N are in the flooding scope of the LSA, the active OSPF instance 104A attempts to reliably flood the LSA to the network elements 101 and 111A-111N. Attempting to reliably flood the LSA includes performing operations 225-235 in one embodiment. At operation 225, the OSPF instance 104A transmits the LSA to the appropriate adjacent network elements. For example, assuming that the network elements 101 and 111A-11N are in the flooding scope of the LSA, the OSPF instance 104A transmits the LSA to the network elements 101 and 111A-111N, with the exception that if the LSA was originated by and received from one of those neighboring network elements, the LSA is not sent to that network element.

Next, at operation 230, the OSPF instance 104A includes the LSA on the retransmission lists 135 for the network elements it transmitted the LSA to. Flow then moves to operation 235 and the OSPF instance 104A maintains the retransmission lists 135 for the network elements that were sent the LSA, which are not synchronized with the OSPF instance 104B. Maintaining the retransmission lists 135 includes removing the LSA from a retransmission list of an adjacent network element after receiving an acknowledgement of receipt of the LSA from that network element. Flow then moves to operation 240.

If the flooding of the LSA is complete (e.g., the retransmission lists 135 for each of the network elements 101 and 111A-111N that were sent the LSA do not include the LSA), then flow moves from operation 240 to operation 245, otherwise flow moves to operation 250. At operation 245, the active OSPF instance 104A causes the backup OSPF instance 104B to alter the status of the LSA to indicate that flooding is complete. For example, the reliable flooding module 130A transmits a message to the reliable flooding module 130B that indicates that the flooding of the LSA is complete, which then removes the LSA from the flood pending list 140. As will be described below, if the LSA is in the flood pending list 140 at a time when the OSPF instance 104B becomes the new-active OSPF instance, that LSA will be flooded to the neighbor network elements in the flooding scope of the LSA; if the LSA is not in the flood pending list at time when the OSPF instance 104B becomes the active OSPF instance, that LSA will not be flooded.

At operation 250 (flooding is not complete), if the OSPF instance 104B becomes the active OSPF instance prior to flooding being complete, then flow moves to operation 255, otherwise flow moves back to operation 240. At operation 250, the OSPF instance 104B attempts to reliably flood the LSA to the network elements in the flooding scope of the LSA (e.g., the network elements 101 and 111A-111N). The OSPF instance 104B performs the reliable flooding similarly as the OSPF instance 104A.

Figure 3:
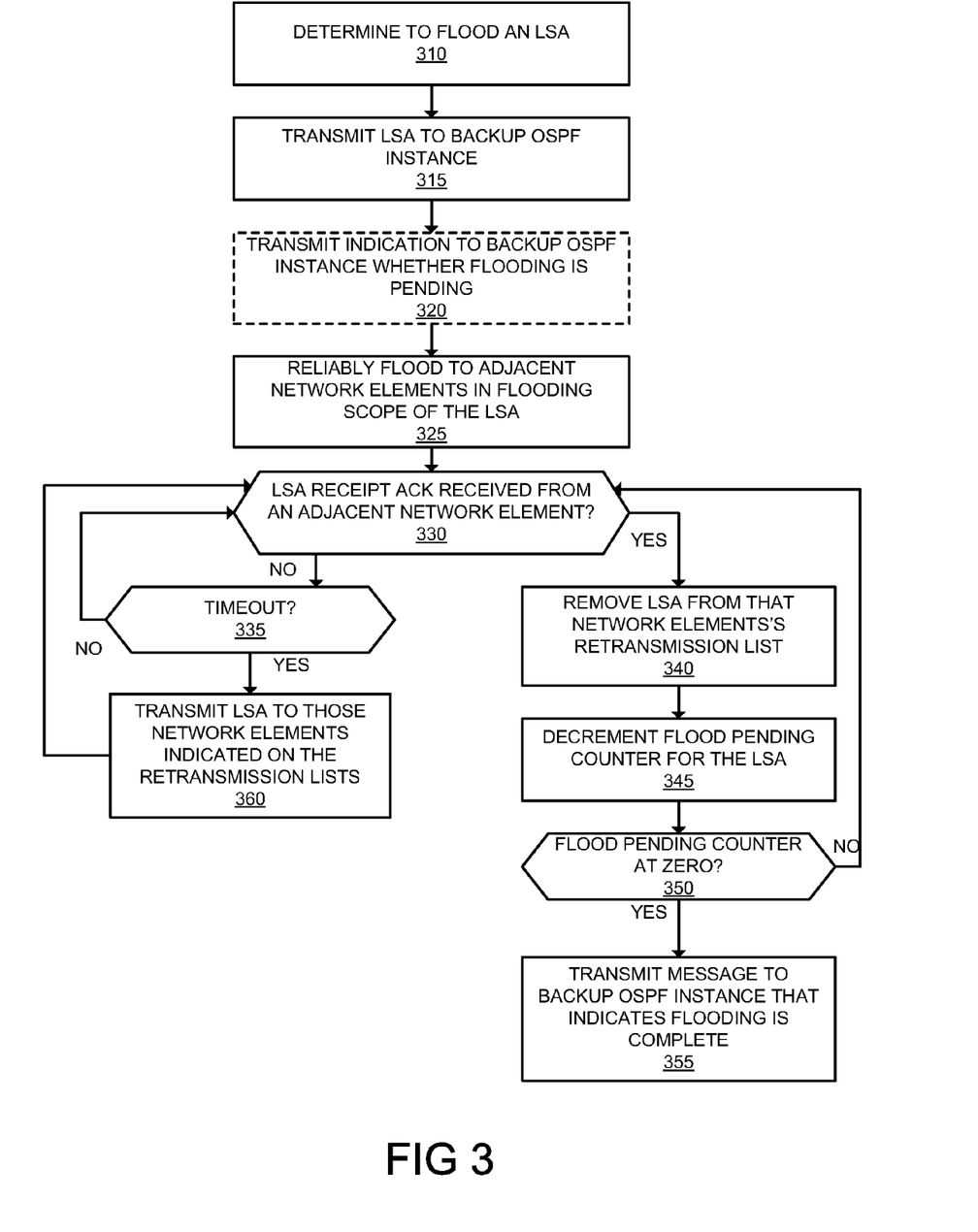
FIG. 3 is a flow diagram illustrating exemplary operations performed by an active OSPF instance in OSPF NSR reliable flooding according to one embodiment.

FIG. 3 is a flow diagram illustrating exemplary operations performed by an active OSPF instance in OSPF NSR reliable flooding according to one embodiment. At operation 310, the OSPF instance 104A, which is currently the active OSPF instance (the OSPF instance 104B is currently the backup OSPF instance), determines to flood an LSA. For example, the OSPF instance 104A receives a new instance of an LSA, originates an LSA, determines to flush an LSA, or determines to refresh an LSA. The OSPF instance 104A installs the LSA into its LSDB 120A if needed. Next, the OSPF instance 104A transmits the LSA to the OSPF instance 104B at operation 315 in order to synchronize the LSDBs of the active and backup OSPF instances. The OSPF instance 104A may also transmit an indication to the backup OSPF instance 104B that indicates whether completion of the flooding is pending.

Flow moves from operation 320 to operation 325, where the OSPF instance 104A attempts to reliably flood the LSA to adjacent network elements in the flooding scope of the LSA. It should be understood that operation 325 may be performed prior to or concurrently with operation 315 and/or 320. In one embodiment, reliably flooding the LSA includes the OSPF instance 104A transmitting the LSA to each of the adjacent network elements in the flooding scope of the LSA with the exception of the network element that transmitted the LSA if the LSA was received, including the LSA in a retransmission list of each of those adjacent network elements, maintaining the retransmission lists, and maintaining a flood pending counter for that LSA. Maintaining a retransmission list includes removing the LSA from that retransmission list responsive to receiving an acknowledgement of receipt of that LSA from the adjacent network element belonging to that list. Maintaining a flood pending counter includes setting the counter to the number of retransmission lists on which the LSA is initially listed, and decrementing the counter every time the LSA is removed from a retransmission list.

Flow moves to operation 330, where the OSPF instance 104A determines whether an LSA receipt acknowledgement for the LSA has been received from an adjacent network element that has been transmitted the LSA (e.g., one of the network elements 101 and/or 111A-111N). If yes, then flow moves to operation 340 and the OSPF instance 104A removes the LSA from that network element's retransmission list 135. If no, then flow moves to operation 335 where it is determined whether the flooding interval has timed out. If it has, then flow moves to operation 360 and the LSA is transmitted to those network elements in which the LSA is included on the retransmission lists, and flow moves back to operation 330.

Flow moves from operation 340 to operation 345, where the OSPF instance 104A decrements the flood pending counter 150 for the LSA. Next, at operation 350, the OSPF instance 104A determines whether the flood pending counter 150 for the LSA is at zero. If it is (which indicates that the OSPF instance 104A has received an acknowledgement of the LSA from those network elements it flooded the LSA to), then flow moves to operation 355 where the OSPF instance 104A transmits a message to the backup OSPF instance 104B that indicates that flooding is complete. If the flood pending counter 150 for the LSA is non-zero (which means that the OSPF instance 104A is still waiting for acknowledgements of the LSA), then flow moves back to operation 330.

Figure 4:
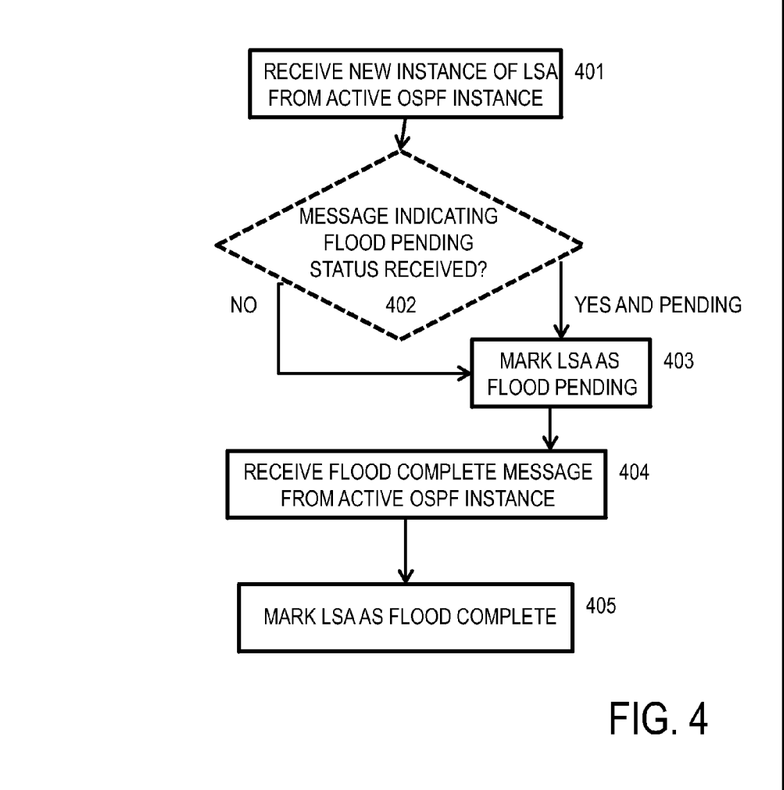
FIG. 4 is a flow diagram illustrating exemplary operations performed on a backup OSPF instance in OSPF NSR reliable flooding according to one embodiment.

FIG. 4 is a flow diagram illustrating exemplary operations performed on a backup OSPF instance in OSPF NSR reliable flooding according to one embodiment. At operation 401, the backup OSPF instance 104B receives a new instance of an LSA from the active OSPF instance 104A. The backup OSPF instance 104B installs the LSA into its LSDB 120B. Next, at operation 402, the backup OSPF instance 104B determines whether a message has been received from the OSPF instance 104A that indicates flooding is pending for the LSA. If such a message has been received, then flow moves to operation 403 and the backup OSPF instance 104B marks the LSA as being flood pending (that is, flooding is not complete for the LSA). If such a message has not been received, then flow also moves to operation 403. For example, the reliable flooding module 130B adds the LSA to the flood pending list 140 to mark that the LSA is flood pending. In another embodiment, the active OSPF instance 104A is configured with the ability to transmit a message associated with transmitting the LSA that indicates that flooding is complete or not necessary (in cases where flooding is either complete or not necessary).

Flow moves from operation 403 to operation 404 where the backup OSPF instance 104B receives a message from the active OSPF instance 104A that indicates that flooding of an LSA is complete (e.g., the message transmitted in operation 355 of FIG. 3). Flow then moves to operation 405 where the LSA is marked that the flooding is complete. For example, the reliable flooding module removes the LSA from the flood pending list 140 to mark that the flooding of the LSA is complete.

Figure 5:
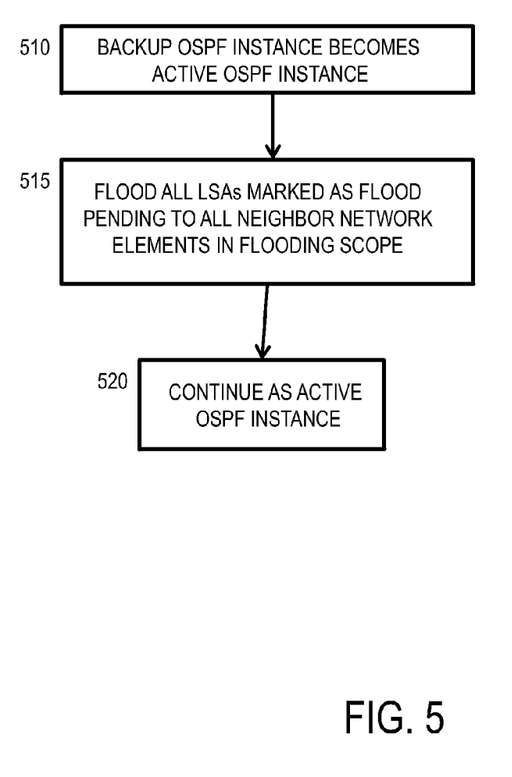
FIG. 5 is a flow diagram illustrating exemplary operations performed by a backup OSPF instance that has transitioned to become the active OSPF instance in OSPF NSR reliable flooding according to one embodiment.

FIG. 5 is a flow diagram illustrating exemplary operations performed by a backup OSPF instance that has transitioned to become the active OSPF instance in OSPF NSR reliable flooding according to one embodiment. At operation 510, the OSPF instance 104B has transitioned to become the active OSPF instance. For example, the OSPF instance 104A may have experienced an error that caused it not to be able to act as the active OSPF instance (e.g., the hardware executing the OSPF instance has failed, the OSPF instance has crashed, etc.) or a planned switchover has occurred. Flow moves from operation 510 to operation 515 where the OSPF instance 104B floods each of the LSAs that are marked as flood pending to all neighbor network elements in its flooding scope. For example, the reliable flooding module 130B accesses the flood pending list 140 to determine which, if any, LSAs are listed. The reliable flooding module 130B transmits each LSA that is listed on the flood pending list 140 to the neighbor network elements in its flooding scope (e.g., one or more of the network elements 101 and 111A-111N). In one embodiment, the OSPF instance 104B floods those LSAs in a reliable way as described with respect to the OSPF instance 104A (e.g., maintains retransmission lists, flood pending counters, etc.). Although a bit more flooding overheard is incurred upon switchover, the steady-state NSR overhead is minimized. For example, since OSPF ignores redundant LSAs, the reliable flooding mechanism described herein maintains the stability of the protocol without needing to update the backup OSPF instance every time the retransmission list changes, which reduces the volume and state associated with maintaining reliable flooding. Flow then moves to operation 520 and the OSPF instance 104B continues as the active OSPF instance.

Figure 6:
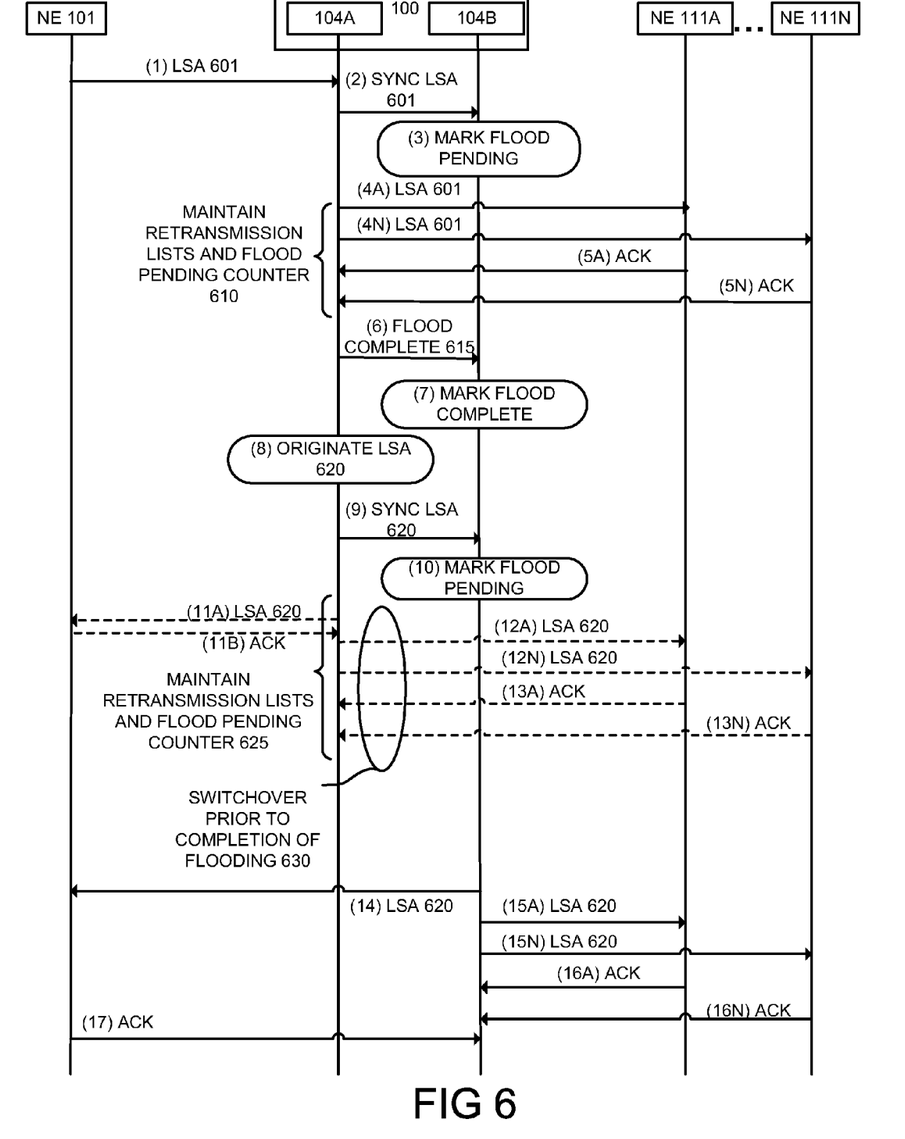
FIG. 6 is a transaction diagram that illustrates operations for OSPF NSR with reliable flooding according to one embodiment.

FIG. 6 is a transaction diagram that illustrates operations for OSPF NSR with reliable flooding according to one embodiment. At operation 1, a new instance of LSA 601 is received from the network element 101 at the OSPF instance 104A. Next, at operation 2, the OSPF instance 104A synchronizes the LSA 601 with the OSPF instance 104B. The OSPF instance 104A may also transmit a message to the OSPF instance 104B that indicates that the flooding of the LSA 601 is pending. Next, at operation 3, the OSPF instance 104B marks the LSA 601 as being flood pending. For example, the reliable flooding module 130B adds the LSA 601 to the flood pending list 140.

At operations 4A-4N, the OSPF instance 104A transmits the LSA 601 to the network elements 111A-111N (they are in the flooding scope of the LSA 601 in this example), and at operations 5A-5N receive acknowledgements from the network elements 111A-111N. Throughout the operations 4A-5N, the OSPF instance 104A maintains 610 retransmission lists (one for each of the network elements 111A-111N with respect to the LSA 601) and a flood pending counter for the LSA 601. For example, each time the LSA 601 is placed on a retransmission list, the flood pending counter for the LSA is incremented. Each time the LSA 601 is removed from a retransmission list (e.g., after receiving acknowledgement from a network element), the flood pending counter for the LSA is decremented.

When flooding is complete (after receipt of acknowledgements from the network elements 111A-111N), then the OSPF instance 104A transmits a message 615 to the OSPF instance 104B that indicates that the flooding has completed for the LSA 601. The OSPF instance 104B then marks the LSA as having completed flooding. For example, the reliable flooding module 130B removes the LSA 601 from the flood pending list 140.

At operation 8, the OSPF instance 104A originates an LSA 620. Next, at operation 9, the OSPF instance 104A synchronizes the LSA 620 with the OSPF instance 104B. The OSPF instance 104A may also transmit a message to the OSPF instance 104B that indicates that the flooding of the LSA 620 is pending. Next, at operation 10, the OSPF instance 104B marks the LSA 620 as being flood pending. For example, the reliable flooding module 130B adds the LSA 620 to the flood pending list 140.

At operations 11A-13N, the normal operations of the OSPF instance 104A are to transmit the LSA 620 to the network elements 101 and 111A-111N (they are part of the flooding scope of the LSA 620) at operations 11A and 12A-N respectively, receive an acknowledgement from the network element 101 at operation 11B and acknowledgements from the network elements 111A-111N at operations 13A-13N, and throughout the operations 11A-13N maintain 625 retransmission lists (one for each of the network elements 101 and 111A-111N with respect to the LSA 620) and a flood pending counter for the LSA 620. However, sometime during these operations, a switchover event 630 occurs prior to completion of the flooding of the LSA 620. It should be understood that the LSA 620 may have been transmitted and acknowledged by some of the network elements 101 and 111A-111N or none of the network elements 101 and 111A-111N prior to the switchover event 630.

After detection of the switchover event 630, the OSPF instance 104B determines whether there are LSA(s) whose flooding has not been completed by the previously active OSPF instance 104A. For example, the reliable flooding module 130B accesses the flood pending list 140 to determine the LSA(s) (if any) whose flooding has not been completed. In this example, the flooding of the LSA 620 has not been completed. Thus, the OSPF instance 104B transmits the LSA 620 to the network element 101 at operation 14, and transmits the LSA 620 to the network elements 111A-111N at operations 15A-15N respectively. The OSPF instance 104B receives acknowledgements from the network elements 111A-111N at operations 16A-N respectively and receives an acknowledgement from the network element 101 at operation 17.

It is unclear whether or how existing OSPF router NSR implementations handle reliable flooding. It would be easy for a naive implementation to miss this problem. Additionally, an implementation may solve the problem but may do it by synchronizing each and every OSPF retransmission list transaction between the active and standby OSPF instance. If every retransmission list operation is synchronized, the volume and state associated with maintaining reliable flooding will increase linearly with the number of neighbors. However, since OSPF ignores redundant LSAs, the reliable flooding mechanism described herein maintains the stability of the protocol without needing to update the backup OSPF instance every time the retransmission list changes, which reduces the volume and state associated with maintaining reliable flooding.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network element for open shortest path first (OSPF) non-stop routing with reliable flooding, the method comprising the steps of:
   responsive to a first OSPF instance of the network element that is currently acting as an active OSPF instance determining to flood a link-state advertisement (LSA), performing the following steps:
   synchronizing the LSA with a second OSPF instance of the network element currently acting as a backup OSPF instance, wherein the step of synchronizing includes storing by the second OSPF instance the LSA with a status that indicates that flooding is pending;
   attempting to reliably flood by the first OSPF instance the LSA to a set of one or more adjacent network elements of a flooding scope of the LSA, the step of attempting includes:
   transmitting the LSA to each of the set of adjacent network elements in the flooding scope of the LSA with an exception of one adjacent network element if the LSA was received from that adjacent network element,
   including the LSA on a plurality of retransmission lists for the plurality of adjacent network elements that the LSA was transmitted to, and
   maintaining the plurality of retransmission lists on the first OSPF instance, wherein the plurality of retransmission lists are not synchronized with the second OSPF instance, wherein the step of maintaining includes removing the LSA from a retransmission list for a network element responsive to receiving an acknowledgement of receipt of that LSA from that network element,
   if flooding of the LSA is complete, then the first OSPF instance causing the second OSPF instance to alter the status of the LSA to indicate that flooding is complete, wherein the flooding of the LSA is complete when the LSA is not indicated on any of the plurality of retransmission lists; and
   if the second OSPF instance has become the currently active OSPF instance prior to the flooding of the LSA completing, then the second OSPF instance attempting to reliably flood the LSA to all of the set of adjacent network elements of the flooding scope of the LSA.

2. The method of claim 1, wherein the second OSPF instance assumes that flooding is pending for each LSA it receives from the first OSPF instance unless the first OSPF instance indicates that flooding is complete for that LSA.

3. The method of claim 1, wherein the step of synchronizing the LSA includes transmitting a message to the second OSPF instance that indicates that flooding is pending for that LSA.

4. The method of claim 3, wherein the step of attempting to reliably flood the LSA is performed substantially concurrently with the step of synchronizing the LSA.

5. The method of claim 1, further comprising the steps of:
   maintaining a counter for the LSA that indicates a current number of retransmission lists that the LSA is included on, wherein maintaining the counter includes decrementing the counter responsive to the LSA being acknowledged from one of the plurality of adjacent network elements, and wherein flooding of the LSA is complete is indicated as being complete when the counter for the LSA is decremented to a predefined value.

6. The method of claim 1, wherein the step of the first OSPF instance causing the second OSPF instance to alter the status of an LSA to indicate that flooding is complete includes sending a message to the second OSPF instance that flooding of that LSA is complete.

7. A network element for open shortest path first (OSPF) non-stop routing with reliable flooding, comprising:
a first OSPF instance, configured to initially act as an active OSPF instance, and having a first reliable flooding module;
a second OSPF instance, configured to initially act as a standby OSPF instance, having a link state database (LSDB), a second reliable flooding module, and a flood pending list;
wherein the first reliable flooding module is configured to:
cause link-state advertisements (LSAs) that it has determined to flood to be stored in the link state database and include each of those LSAs to be flooded on the flood pending list until flooding of that LSA is complete;
reliably flood the LSAs stored on the flood pending list to one or more adjacent network elements, wherein reliable flooding of an LSA is complete when an acknowledgement is received from each of the set of adjacent network elements;
upon reliable flooding of an LSA being complete, cause that LSA to be removed from the flood pending list of the second OSPF instance; and
wherein the second reliable flooding module is configured to:
after the second OSPF instance becomes the active OSPF instance, flood all LSAs included on the flood pending list to one or more adjacent network elements.

8. The network element of claim 7, wherein the first reliable flooding module is further configured to flood self-originated LSAs to all adjacent network elements.

9. The network element of claim 7, wherein the first reliable flooding module is configured to flood LSAs received from adjacent network elements that it has determined to flood to all adjacent network elements except the one from which the LSA was received.

10. The network element of claim 7, wherein the first reliable flooding module is further configured to include each LSA it has determined to flood to the one or more adjacent network elements on one or more retransmission lists associated with the one or more adjacent network elements, and wherein the first reliable flooding module is further configured to remove an LSA from a retransmission list associated with a network element responsive to an acknowledgement of receipt of that LSA from that network element.

11. The network element of claim 10, wherein the first OSPF instance further includes flood pending counters, wherein each one of the flood pending counters indicates a number of retransmission lists on which one of the LSAs is awaiting acknowledgement, and wherein flooding of an LSA is complete when its corresponding flood pending counter indicates that the LSA is not on any of the plurality of retransmission lists.

12. The network element of claim 7, wherein the first reliable flooding module is configured to, for each LSA it has determined to flood, send a message to the second reliable flooding module that indicates that flooding of that LSA is pending to cause that LSA to be included on the flood pending list.

13. The network element of claim 7, wherein the first reliable flooding module is configured to, upon reliable flooding of an LSA being complete, send a message to the second reliable flooding module that indicates that flooding of that LSA is complete to cause that LSA to be removed from the flood pending list.

14. A method in a network element for open shortest path first (OSPF) non-stop routing with reliable flooding, the network element including a first OSPF instance that initially is acting as an active OSPF instance and a second OSPF instance that initially is acting as a backup OSPF instance, the method comprising the steps of:
the first OSPF instance reliably flooding LSAs, wherein for each LSA to be flooded, the first OSPF instance synchronizes that LSA with the second OSPF instance with a status of flood pending;
responsive to reliable flooding of an LSA being complete, the first OSPF instance causing the second OSPF instance to alter the status of that LSA to indicate that flooding is complete including the first OSPF instance sending a message notifying the second OSPF instance that flooding is complete; and
responsive to the second OSPF instance becoming the currently active OSPF instance, the second OSPF instance reliably flooding those LSAs that have a status of flood pending.

15. The method of claim 14 wherein the step of reliably flooding LSAs includes the following for each LSA to be flooded:
determining a flooding scope for the LSA that includes a set of one or more adjacent network elements;
transmitting the LSA to each of the set of adjacent network elements in the flooding scope of the LSA with an exception of one adjacent network element if the LSA was received from that adjacent network element;
including the LSA on a set of one or more retransmission lists for the set of adjacent network elements that the LSA was transmitted to respectively, and
maintaining the set of retransmission lists including removing the LSA from a retransmission list for a network element responsive to receiving an acknowledgement of receipt of that LSA from that network element.

16. The method of claim 14, wherein the step of synchronizing the LSA with a status of flood pending includes the first OSPF instance sending the second OSPF instance a message to cause the second OSPF instance to store the LSA on a flood pending list.

17. The method of claim 14, wherein reliable flooding of an LSA is complete when the first OSPF instance has received acknowledgements of the LSA from all network elements to which the LSA was sent.

18. The method of claim 17, further comprising the steps of:
maintaining a counter for each LSA reliably flooded that indicates a current number of retransmission lists that the LSA is included on, wherein maintaining the counter includes decrementing the counter responsive to receipt of the LSA being acknowledged, and
wherein flooding of the LSA is indicated as being complete when the counter for the LSA is decremented to a predefined value.

* * * * *

UNITED STATES PATENT AND TRADEMARK OFFICE
CERTIFICATE OF CORRECTION

PATENT NO.       : 8,717,935 B2            Page 1 of 1
APPLICATION NO.  : 13/310653
DATED            : May 6, 2014
INVENTOR(S)      : Lindem, III et al.

It is certified that error appears in the above-identified patent and that said Letters Patent is hereby corrected as shown below:

In the Specification

Column 4, Line 58, delete "minimized" and insert -- minimized. --, therefor.

Column 5, Line 31, delete "minimized" and insert -- minimized. --, therefor.

Column 6, Lines 30-31, delete "111A-11N" and insert -- 111A-111N --, therefor.

Column 8, Line 4, delete "111A-11N" and insert -- 111A-111N --, therefor.

In the Claims

Column 14, Line 30, in Claim 15, delete "claim 14" and insert -- claim 14, --, therefor.

Signed and Sealed this
Ninth Day of September, 2014

Michelle K. Lee
*Deputy Director of the United States Patent and Trademark Office*